United States Patent
Robertson et al.

(10) Patent No.: US 8,205,515 B2
(45) Date of Patent: Jun. 26, 2012

(54) RACK BUSHING FOR AN AUTOMOTIVE STEERING SYSTEM

(75) Inventors: James R. Robertson, Walled Lake, MI (US); John F. Laidlaw, Dearborn, MI (US)

(73) Assignee: Ford Global Technologies, Dearborn, MI (US)

( * ) Notice: Subject to any disclaimer, the term of this patent is extended or adjusted under 35 U.S.C. 154(b) by 1072 days.

(21) Appl. No.: 12/108,999

(22) Filed: Apr. 24, 2008

(65) Prior Publication Data
US 2009/0265885 A1    Oct. 29, 2009

(51) Int. Cl.
*B62D 5/10* (2006.01)
(52) U.S. Cl. .......... 74/89.17; 74/422; 384/278; 384/296
(58) Field of Classification Search .................. 384/278, 384/295, 296; 74/422, 89.17
See application file for complete search history.

(56) References Cited

U.S. PATENT DOCUMENTS

| | | | |
|---|---|---|---|
| 3,788,159 A | 1/1974 | Plant, II | |
| 3,869,139 A | 3/1975 | Gage | |
| 5,181,581 A * | 1/1993 | Engler | 180/428 |
| 5,271,476 A | 12/1993 | Minamibata | |
| 6,155,375 A | 12/2000 | Gierc et al. | |
| 6,330,929 B1 * | 12/2001 | Gierc et al. | 180/428 |
| 6,644,430 B2 | 11/2003 | Harer et al. | |
| 2006/0219467 A1 | 10/2006 | Damore et al. | |

FOREIGN PATENT DOCUMENTS

JP     2002-284026    * 10/2002

OTHER PUBLICATIONS

Machine tranlation of Korean Publication KR 2002-0066114, published Aug. 2002.*

* cited by examiner

*Primary Examiner* — William C Joyce
(74) *Attorney, Agent, or Firm* — Angela M. Brunetti; Fredrick Owens

(57) ABSTRACT

A bushing for use in a hollow tube housing of a rack and pinion steering system. The bushing is formed as a generally cylindrical body having a central aperture and a circular cantilevered flange that extends outward from the body of the bushing. The flange contains a leading surface for compression contact with a corresponding interfering surface on the hollow interior of the rack housing. The flange is disposed to continuously compress a portion of its leading surface against a portion of the interfering surface on the hollow interior of the housing over a predetermined range of temperatures when the bushing is installed in the housing, and thereby providing thermal compensation to maintain a seal.

15 Claims, 2 Drawing Sheets

RACK BUSHING FOR AN AUTOMOTIVE STEERING SYSTEM

BACKGROUND

1. Field of the Invention

This invention relates to the field of Automotive steering systems and more specifically to improvements in a rack bushing which is used to retain seals in the rack housing while allowing for longitudinal movement of a rack portion extending from the housing.

2. Description of the Prior Art

Typically, a bushing is provided in the rack housing or "tube" of a rack and pinion steering system to allow the rack to move longitudinally while preventing the leakage of steering fluid from inside the housing. In some cases, threaded bushings have a tendency to vibrate loose over time. While encountering a cyclical range of temperatures in which a vehicle is expected to operate, there is considerable expansion and contraction of components. When the bushing and the housing are formed of materials that have dissimilar coefficients of expansion, such as aluminum for the housing and steel for the bushing, there is opportunity for the bushing to lose its frictional engagement with the internal portions of the housing and work loose over time.

Some prior art attempts to prevent axial movement of bushings have resulted in the use of additional locking components. For instance, in US Patent Publication 2006/0219467 a non-threaded bushing is shown that contains an outer annular recess that is collocated adjacent a hole in the rack tube to which it is mounted. Material is injected through a hole into the recess to lock the bushing in place. In U.S. Pat. No. 6,644,430 a non-threaded bushing contains an annular groove on its outer surface and the tube is crushed radially inward to hold the bushing in place. In U.S. Pat. No. 6,155,375, a non-threaded bushing is shown that has an annular groove on its outer surface that is positioned below a corresponding annular groove in the rack tube. A lock wire is inserted into the grooves to hold the bushing in place.

SUMMARY OF THE INVENTION

The present invention solves the problem of bushings becoming loose over time, without additional assembly components. By uniquely configuring the lead in portion of the bushing in front of its outer threads, the bushing can be installed in the rack housing in a conventional manner, maintain its frictional tightness in the housing over a wide range of elevated temperatures. The advantages of solving the problem without the use of additional assembly components are considerable from both standpoint of additional cost for such assembly components as well as added labor in transporting and handling any such components prior to assembly of the steering system.

By configuring the bushing in a prescribed manner during its manufacture, to form a cantilevered flange that engages the inner portion of the rack housing, the problem is solved and the steering system assembly process becomes unchanged in any significant way.

The present invention is directed to a bushing for use in a hollow tube housing of a rack and pinion steering system. The housing has an end portion thereof for engaging the bushing and allowing an extension of a rack gear located within the housing to extend outwardly from the housing and through the bushing for longitudinal relative movement. The bushing is formed as a generally cylindrical body having a central aperture for surrounding the rack extension. A circular cantilevered flange extends outward from the body of the bushing and contains a leading surface for compression contacting a corresponding interfering surface on the hollow interior of the housing. The circular cantilevered flange is disposed to continuously compress a portion of its leading surface against a portion of the interfering surface on the hollow interior of the housing over a predetermined range of temperatures when the bushing is installed in the housing.

It is an object of the present invention to provide an improved bushing for use in a rack and pinion steering housing of an automotive steering system, wherein the bushing is thermally compensated with respect to the housing which is formed of a material having a thermal coefficient of expansion that is higher than the material used to form the bushing.

It is another object of the present invention to provide an improved bushing for use in a rack and pinion steering housing of an automotive steering system, wherein the bushing contains a cantilevered flange ahead of outer threads form interfering and being continually compressed against an interference wall interior to the housing.

It is a further object of the present invention to claim a method of providing a bushing for use in a hollow tube housing of a rack and pinion system for automotive vehicles, comprising the steps of providing the housing with an inner threaded portion and a interfering surface on the hollow interior adjacent one end of the housing; forming the bushing with a generally cylindrical body having a central aperture for allowing an extension of a rack gear located within the housing to extend outwardly from the housing and through the bushing for longitudinal relative movement; providing the bushing with an outer threaded portion for engagement with the inner threaded portion of the housing; and providing a circular cantilevered flange extending outward from the body of the bushing with a leading surface for contacting the interfering surface on the hollow interior of the housing and maintaining continuous compression of a portion of the leading surface against a portion of the interfering surface over a predetermined range of temperatures, when the bushing is threaded in the housing.

DETAILED DESCRIPTION

Figure 1:
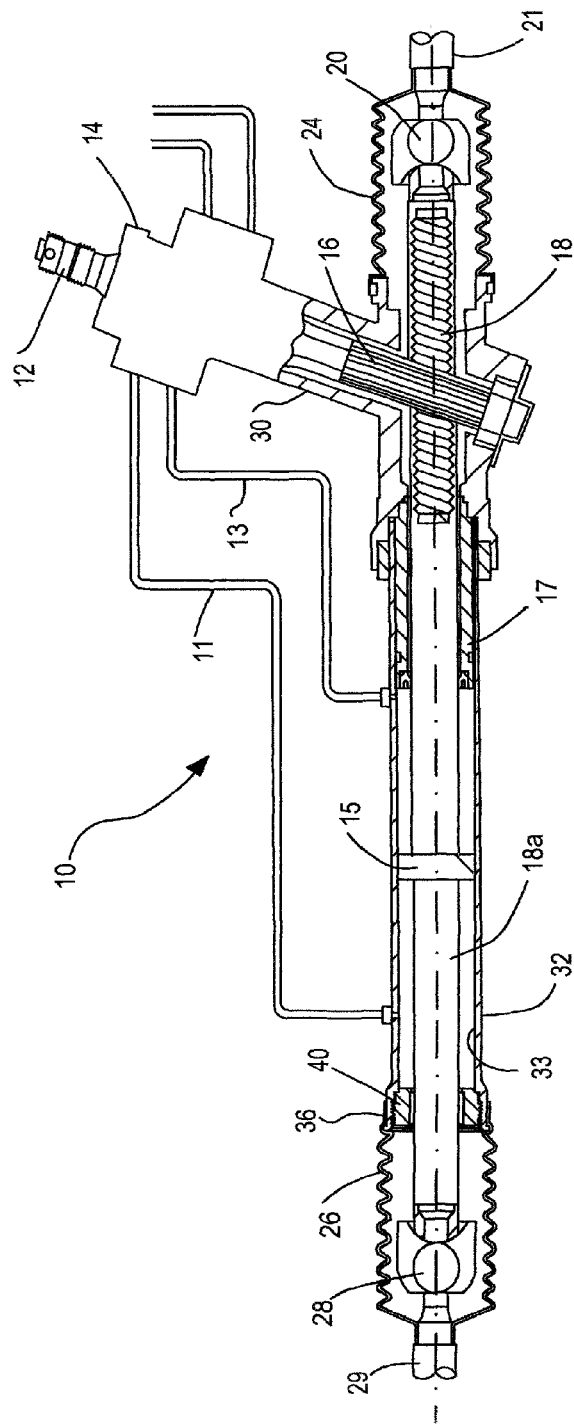
FIG. 1 is a partial cross-sectional view of a conventional rack and pinion gear housing as used in an automotive power steering system.

The conventional steering system 10 shown in FIG. 1 includes a steering input shaft 12 extending from a steering wheel (not shown) that is controlled by the vehicle operator. A power steering control valve 14 has conduit connections 11 and 13 which provide steering fluid to either side of a piston 15 that resides on an extension 18a of a rack gear 18 within a rack housing 32. A steering gear housing 30 is joined with rack housing 32 and allows the interaction between the axially rotatable opinion gear 16 and the linearly movable rack gear 18. One end of steering gear housing 30 has an opening 31 through which the rack gear 18 extends to engage a ball joint 20 and tie rod 21. Boot seal 24 is connected between the housing end 31 and tie rod 20 to prevent dirt and water from contaminating the components, their connections and lubricants. A second end of steering gear housing 30 has an opening 35 to which rack housing 32 is connected. Rack extension 18a may be attached to, or an integral part of, rack gear 18. Rack housing 32 has a hollow actuation chamber defined by inner surface 33 which contains rack gear extension 18a and steering fluid under pressure against piston 15. Bushings 17 and 40 are provided at either end of rack housing 32. Several "O" rings and other forms of liquid seals are normally included, but are not shown here for simplicity in explaining the invention. Bushing 40 provides support for longitudinal movement of the rack gear extension 18a in the rack housing 32 while also supporting seals to maintain the pressurized steering fluid within hollow actuation chamber defined by inner surface 33. At the end of the rack housing 32 containing bushing 40, the rack extension 18a is connected to ball joint 28 and to tie rod 29. Boot seal 26 serves to prevent contamination to the covered components.

Figure 2A:
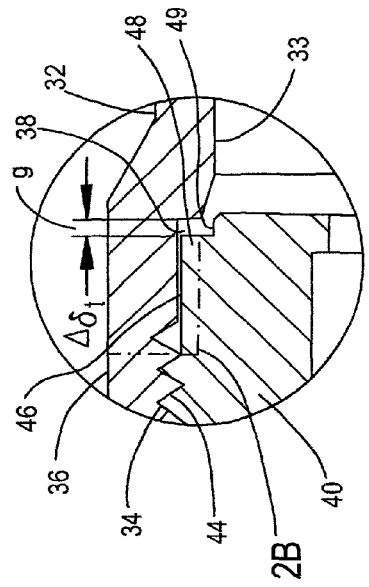
FIG. 2A is a close up cross-sectional view of the prior art bushing in FIG. 2 during a condition of elevated temperatures.
Figure 2:
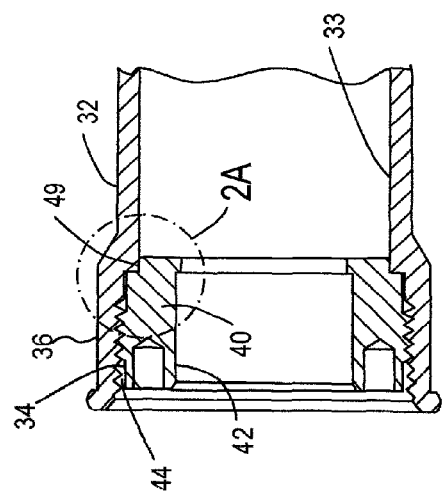
FIG. 2 is a cross-sectional view of a prior art bushing as is typically used in a conventional rack and pinion gear housing.

FIG. 2 shows a close up of the bushing 40 threaded into the flared opening 36 of rack housing 32. Opening 36 contains inner threads 34 and an interfering annular face 38 inward of threads 34. Bushing 40 is formed as a generally cylindrical body having a central aperture 42 through which the rack extension 18a is supported for longitudinal movement. External threads 44 are located on the outer surface of bushing 40 behind a leading circular face 48. Upon installation in rack housing 32, bushing 42 is threaded into opening 36 until leading circular face 48 abuts against interfering annular face 38 and leading cylindrical surface 49 is frictionally engaged against inner surface 33 of rack housing 32. Bushing 40 is tightened to a predetermined torque value and the assembly of the bushing 40 to rack hosing 32 is complete.

In the steering system shown, rack housing 32 is constructed on aluminum alloy and the bushing is formed of steel alloy. Each of these metals has a thermal coefficient of expansion that is considerably different. For instance, an annular portion of aluminum housing 32, with a thermal coefficient of expansion of $23 \times 10^{-6}$ mm/mm/° C., along a 9 mm length has been determined to expand its length by $1.74 \times 10^{-2}$ mm from 70° F. (the approximate room temperature at the time of steering system assembly) to 200° F. Similarly, for the steel bushing 40 with a thermal coefficient of expansion of $12 \times 10^{-6}$ mm/mm/° C., an identical length has been determined to expand only $0.91 \times 10^{-2}$ mm from 70° F. to 200° F.

FIG. 2A illustrates the result of the bushing 40 of FIG. 2 after the assembled components are in an environment of elevated temperatures. A gap "g" develops that is of a dimension $\Delta\delta_t$ due to a change in temperature from the time of assembly, where $\delta_t$ represents the differences in thermal expansion characteristics between aluminum $\delta_a$ and steel $\delta_s$. ($\delta_t = \delta_a - \delta_s$). In the illustrated case, the dimension $\Delta\delta_t$ is 0.008 mm.

When separation occurs between leading circular face 48 and interfering annular face 38 the frictional forces normally present between those faces that prevent de-threading from occurring are lost. Subsequent vibration that may occur during this time can cause the bushing 40 to start to de-thread and loosen both the bushing and the fluid seals.

Figure 3:
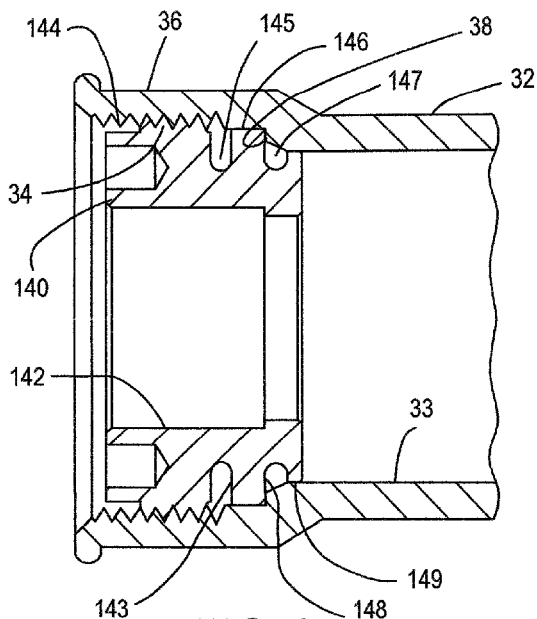
FIG. 3 is a cross-sectional view of one embodiment of the present invention installed in a rack and pinion gear housing at elevated temperatures.
Figure 3A:
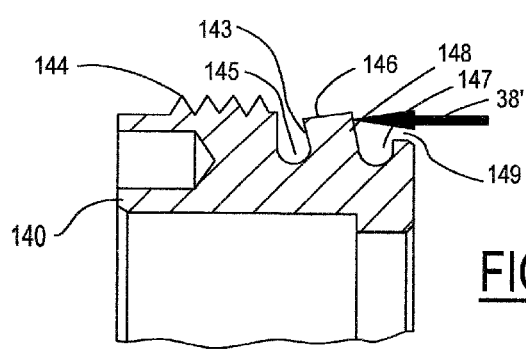
FIG. 3A is a close up cross-sectional view of the embodiment shown in FIG. 3 with forces applied to its flange when installed at lower temperatures.

A first embodiment of the invention is shown in FIG. 3. The cross-sectional view illustrates a bushing 140 threaded into end 36 of rack housing 32. Threads 144 are the same as in the conventional bushing 40. However, the modification that incorporates the invention is in the forward lead end of bushing 140. In that location, a cantilevered circular flange 146 is formed that has a leading surface 147 and a trailing surface 143. Grooves 145 and 146 are cut into the body of bushing 140 to form the cantilevered circular flange 146 as well as surfaces 143 and 147. In this manner of construction, the flange 146 is compressed and deflected backwards into the space formed above groove 145, as shown in FIG. 3A, when it is fully torqued into end 36 of housing 32. Forces 38' provided by compressing flange 146 against interfering surface 38 cause some deflection. Cantilevered circular flange 146 acts as a spring and when fully engaged is in compression contact against the corresponding interfering surface 38 on the interior of housing 32. The circular cantilevered flange 146 is disposed to have a portion thereof continuously compress a portion of its leading surface 148 against a portion of the interfering surface 38 on the hollow interior of housing 32 over a predetermined range of temperatures when the bushing is installed in the housing. This allows the leading cylindrical surface 149 to extend further into the housing 32 and to maintain its frictional engagement against inner surface 33 over the predetermined range of temperatures. In this manner, a seal is maintained throughout the predetermined range of temperatures and the bushing is frictionally held to prevent loosening. When the temperature is elevated to the end of the design range (approximately 200° F.), the circular cantilevered flange 146 is still in contact with interfering surface 38 as is shown in FIG. 3.

Figure 4:
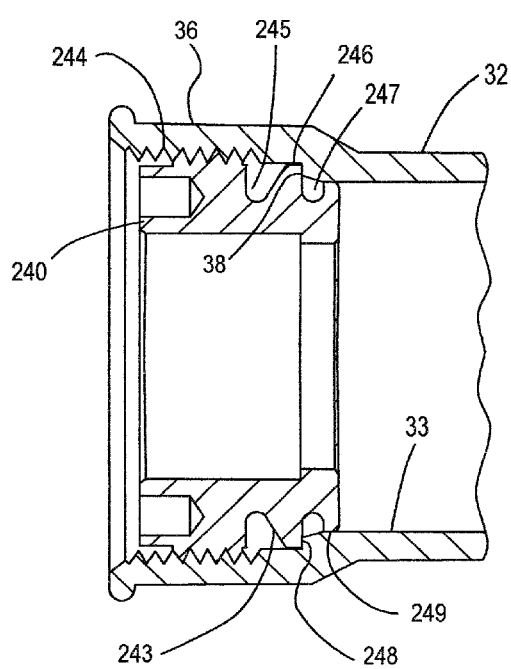
FIG. 4 is a cross-sectional view of another embodiment of the present invention installed in a rack and pinion gear housing at elevated temperatures.

A second embodiment is shown in FIG. 4, wherein a bushing 240 containing external threads 244 is formed with a cantilevered circular flange 246. In this case, cantilevered circular flange 246 is formed on bushing 240, by groove cuts 245 and 247 made into the body of bushing 240. In this embodiment, rear surface 243 of flange 246 is cut at an angle to provide a truncated or tapered shape to the cross-section of the flange 246. Rear 243 surface is sloped forward towards the leading surface 248 and faces rear groove cut 245. Although not shown in its deflected state, this second embodiment allows greater flexibility to the spring deflection of the cantilevered circular flange 246 when it is full torque against interfering wall 38. This second embodiment also allows the leading cylindrical surface 249 to extend further into the housing 32 than the conventional bushing 40 and to maintain its frictional engagement against inner surface 33 over the predetermined range of temperatures. FIG. 4 illustrates the cantilevered circular flange 246 of the second embodiment in its compressed state against interference surface 38, but at the elevated end of the predetermine range of temperatures when it is no longer perceivably deflected towards the rear.

It should be understood that the foregoing description of the embodiments is merely illustrative of many possible implementations of the present invention and is not intended to be exhaustive.

We claim:

1. A bushing for use in a hollow tube housing of a rack and pinion steering system, wherein said housing has an inner thread portion at one end thereof for engaging an outer thread portion of said bushing and allowing an extension of a rack gear located within said housing to extend outwardly from said housing and through said bushing for longitudinal relative movement;

said bushing being formed as a generally cylindrical body having a central aperture for surrounding said rack extension, a circular cantilevered flange extending radially outward from the body of said bushing and containing a leading surface on said circular cantilevered flange for compression contacting a corresponding interfering surface on the hollow interior of said housing, the circular cantilevered flange being formed by the distance remaining between a pair of longitudinally spaced annular grooves formed into the bushing body; and said circular cantilevered flange disposed to continuously compress a portion of its leading surface against a portion of said interfering surface on the hollow interior of said housing over a predetermined range of temperatures when said bushing is installed in said housing.

2. A bushing, as in claim 1, for use in said housing being formed of a first material having a first predetermined thermal coefficient of expansion, and wherein said bushing is formed of a second material having a second predetermined thermal coefficient of expansion that is less than that of said first material.

3. A bushing as in claim 2, for use in said housing being formed of an aluminum alloy having a thermal coefficient of expansion that is higher than a thermal coefficient of expansion of a material of said bushing.

4. A bushing as in claim 3, wherein the bushing is formed of a steel alloy having a thermal coefficient of expansion that is lower than a thermal coefficient of expansion of a material of said housing.

5. A bushing as in claim 1, wherein said housing has an inner thread portion at one end thereof and said bushing is formed to be threaded into said housing and preloaded with forces sufficient to cause said circular cantilevered flange, in contact with said interfering surface, to deflect into the space defined by said adjacent rear one of said grooves and maintain compression contact with said interfering surface over a predetermined range of temperatures.

6. A bushing as in claim 5, wherein said circular cantilevered flange is formed to extend from said bushing body with a rear surface being substantially parallel to said leading surface and facing the adjacent rear one of said grooves.

7. A bushing as in claim 5, wherein said circular cantilevered flange is formed to extend from said bushing body and tapered with a rear surface being sloped forward towards said leading surface and facing a rear one of said pair of grooves.

8. A bushing as in claim 1, wherein said housing has an inner thread portion at one end thereof, said interfering surface on the hollow interior of said housing is located axially inward of the inner thread portion with respect to said end, and wherein said bushing is formed to be threaded into said housing and preloaded with forces sufficient to cause said circular cantilevered flange, in contact with said interfering surface, to deflect towards said threads and maintain compression contact with said interfering surface over a predetermined range of temperatures.

9. A method of providing a bushing for use in a hollow tube housing of a rack and pinion steering system for automotive vehicles, comprising the steps of:

providing said housing with an inner threaded portion and an interfering surface on the hollow interior adjacent one end of said housing;

forming said bushing with a generally cylindrical body having a central aperture for allowing an extension of a rack gear located within said housing to extend outwardly from said housing and through said bushing for longitudinal relative movement;

providing said bushing with an outer threaded portion for engagement with said inner threaded portion of said housing; and providing a circular cantilevered flange extending radially outward from the body of said bushing and being formed by the distance remaining between a pair of longitudinally spaced annular grooves formed into the bushing body the circular cantilevered flange having a leading surface for contacting said interfering surface on the hollow interior of said housing and maintaining continuous compression of a portion of said leading surface against a portion of said interfering surface over a predetermined range of temperatures, when said bushing is threaded in said housing.

10. A method as in claim 9, further comprising the steps of providing said housing formed of a first material having a first predetermined thermal coefficient of expansion, and forming said bushing of a second material having a second predetermined thermal coefficient of expansion that is less than that of said first material.

11. A method as in claim 10, wherein said step of providing said housing includes said housing being formed of an aluminum alloy having a thermal coefficient of expansion that is higher than a thermal coefficient of expansion of a material of said bushing.

12. A method as in claim 11, wherein said step of providing said bushing includes the step of said bushing being formed of a steel alloy having a thermal coefficient of expansion that is lower than a thermal coefficient of expansion of a material of said housing.

13. A method as in claim 9, including the step of threading said bushing into said housing and preloading said bushing with forces sufficient to cause said circular cantilevered flange, in contact with said interfering surface, to deflect into the space defined by an adjacent rear one of said grooves and maintain compression contact with said interfering surface over a predetermined range of temperatures.

14. A method as in claim 13, wherein said step of providing a circular cantilevered flange includes the step of said circular cantilevered flange being formed extend from said bushing body with a rear surface being substantially parallel to said leading surface and facing the adjacent rear one of said grooves.

15. A method as in claim 13, wherein said step of providing a circular cantilevered flange includes the step of said circular cantilevered flange being formed extend from said bushing body and tapered with a rear surface being sloped forward towards said leading surface and facing the adjacent rear one of said grooves.

* * * * *